United States Patent
Nguyen

(10) Patent No.: US 9,370,791 B1
(45) Date of Patent: Jun. 21, 2016

(54) VACUUM PUMP AND DISPENSER FOR BOTTLES

(71) Applicant: Trong D Nguyen, Sacramento, CA (US)

(72) Inventor: Trong D Nguyen, Sacramento, CA (US)

( * ) Notice: Subject to any disclaimer, the term of this patent is extended or adjusted under 35 U.S.C. 154(b) by 241 days.

(21) Appl. No.: 14/158,745

(22) Filed: Jan. 17, 2014

(51) Int. Cl.
*B65B 1/04* (2006.01)
*B05B 11/00* (2006.01)
*F04B 53/12* (2006.01)
*B65D 81/20* (2006.01)
*B65B 31/04* (2006.01)

(52) U.S. Cl.
CPC ........... *B05B 11/3045* (2013.01); *B65B 31/047* (2013.01); *B65D 81/2038* (2013.01); *F04B 53/127* (2013.01)

(58) Field of Classification Search
CPC ............. B65B 31/047; B65D 81/2015; B65D 81/2038
USPC ............................... 141/65; 215/228; 222/152
See application file for complete search history.

(56) References Cited

U.S. PATENT DOCUMENTS

| | | | |
|---|---|---|---|
| 17,810 A | 7/1857 | Simmons | |
| 943,951 A | 12/1909 | Moody | |
| 2,224,296 A | 7/1936 | Hoffman | |
| 2,812,113 A | 10/1955 | Beall, Jr. | |
| 2,769,457 A | 11/1956 | Wittenberg | |
| 3,159,176 A | 12/1964 | Russell et al. | |
| 3,405,838 A | 10/1968 | Preisendanz | |
| 3,506,167 A * | 4/1970 | Orr | B65D 23/04 215/309 |
| 3,602,387 A | 8/1971 | Patnaude | |
| 3,670,915 A | 6/1972 | Forman | |
| 3,880,187 A | 4/1975 | Kneusel | |
| 3,966,099 A | 6/1976 | Sanford, Jr. et al. | |
| 4,249,583 A | 2/1981 | Lundbladh | |
| 4,287,819 A | 9/1981 | Emerit | |
| 4,524,877 A | 6/1985 | Saxby et al. | |
| 4,696,416 A | 9/1987 | Muckenfuhs et al. | |
| 4,763,803 A * | 8/1988 | Schneider | B65D 51/165 141/65 |
| 4,889,250 A * | 12/1989 | Beyer | B67D 1/10 215/228 |
| 4,911,314 A | 3/1990 | Schneider | |
| 4,975,028 A | 12/1990 | Schultz | |
| 4,998,633 A | 3/1991 | Schneider | |
| 5,031,785 A | 7/1991 | Lemme | |
| 5,465,857 A * | 11/1995 | Yang | B65B 31/047 137/522 |
| 5,535,900 A | 7/1996 | Huang | |
| 5,540,557 A * | 7/1996 | Carson | B65D 81/2038 141/65 |
| 5,941,391 A | 8/1999 | Jury | |
| 5,944,211 A | 8/1999 | Woodnorth et al. | |
| 6,053,366 A | 4/2000 | Legue | |
| 6,637,321 B2 | 10/2003 | Wang | |
| 7,048,136 B2 | 5/2006 | Havens et al. | |
| 7,051,901 B2 | 5/2006 | Hickert | |
| 7,086,427 B2 | 8/2006 | Bonich | |
| 7,204,760 B2 | 4/2007 | Wang | |
| 7,614,522 B2 | 11/2009 | Hsu | |

(Continued)

FOREIGN PATENT DOCUMENTS

| | | |
|---|---|---|
| CN | 2132712 Y | 5/1993 |
| DE | 1068071 B2 | 10/1959 |

(Continued)

*Primary Examiner* — Daniel R Shearer
(74) *Attorney, Agent, or Firm* — Ernesto Garcia

(57) ABSTRACT

A vacuum pump accommodates a drip-proof dispenser so that the vacuum pump encapsulates and houses the dispenser. The same vacuum pump functions as cap to keep the vacuum pump and the dispenser on a bottle. The vacuum pump further incorporates a de-vacuuming feature, a damper feature, and anti-pinching feature while implementing a one-way valve as part of the vacuum pump.

25 Claims, 6 Drawing Sheets

(56) References Cited

U.S. PATENT DOCUMENTS

| | | |
|---|---|---|
| 7,703,702 B2 | 4/2010 | Strong |
| 8,146,765 B2 | 4/2012 | Chen |
| 2008/0035598 A1* | 2/2008 | Simons .............. B01F 3/04099 215/228 |
| 2012/0161044 A1 | 6/2012 | Chen |
| 2014/0263453 A1* | 9/2014 | Haley .................... B65D 39/00 222/152 |

FOREIGN PATENT DOCUMENTS

| | | |
|---|---|---|
| DE | 1133650 B | 7/1962 |
| DE | 1987459 U | 6/1968 |
| EP | 1900649 A1 | 3/2008 |
| FR | 1487094 | 6/1967 |
| FR | 2739840 A1 | 4/1997 |
| WO | 98/08748 A1 | 3/1998 |
| WO | 2009-116093 A1 | 9/2009 |

* cited by examiner

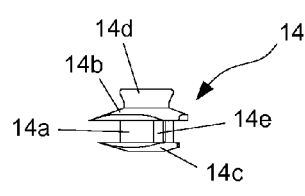
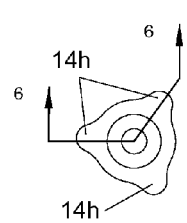
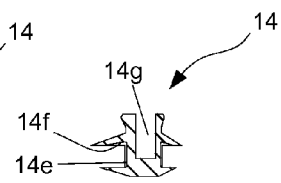
Fig. 4  Fig. 5  Fig. 6
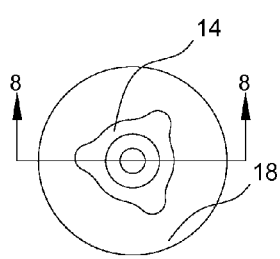
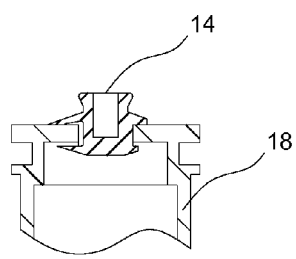
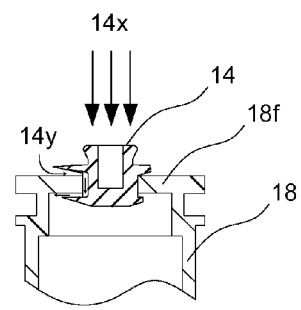
Fig. 7  Fig. 8  Fig. 9
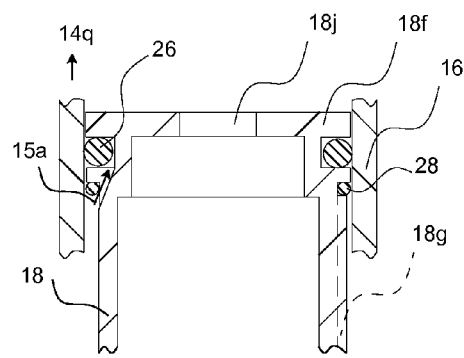
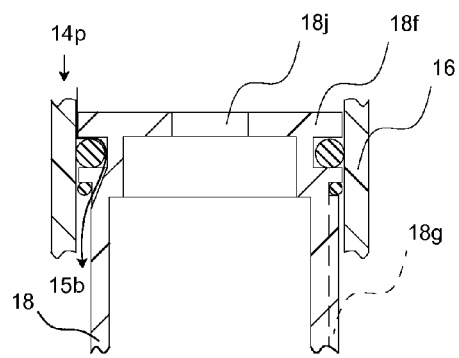
Fig. 10  Fig. 11

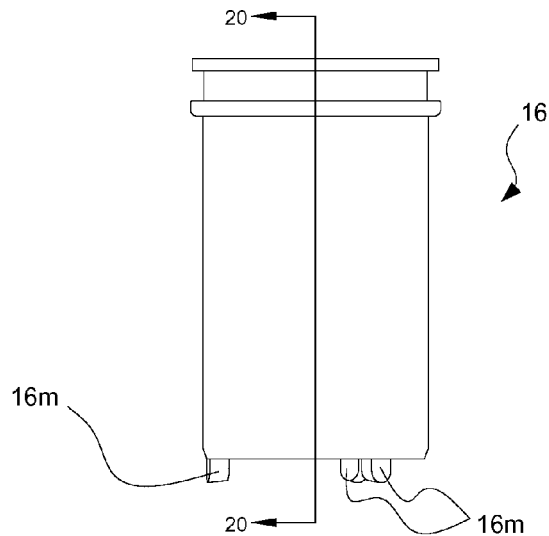
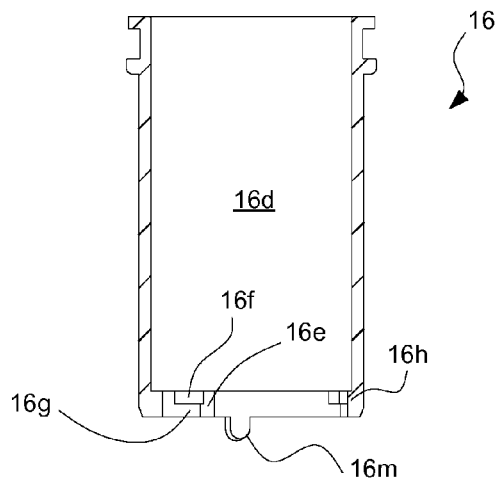
Fig. 19
Fig. 20
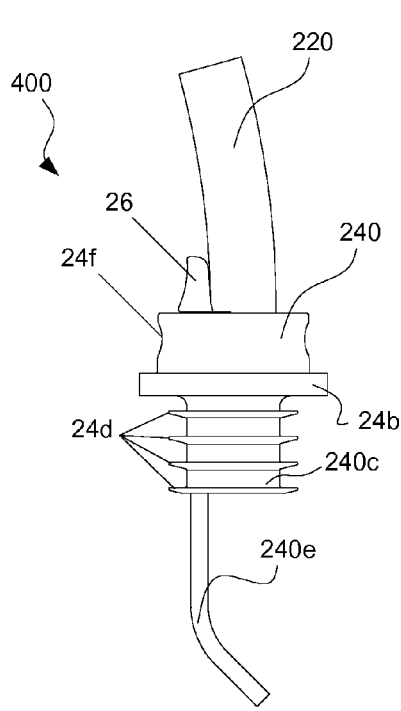
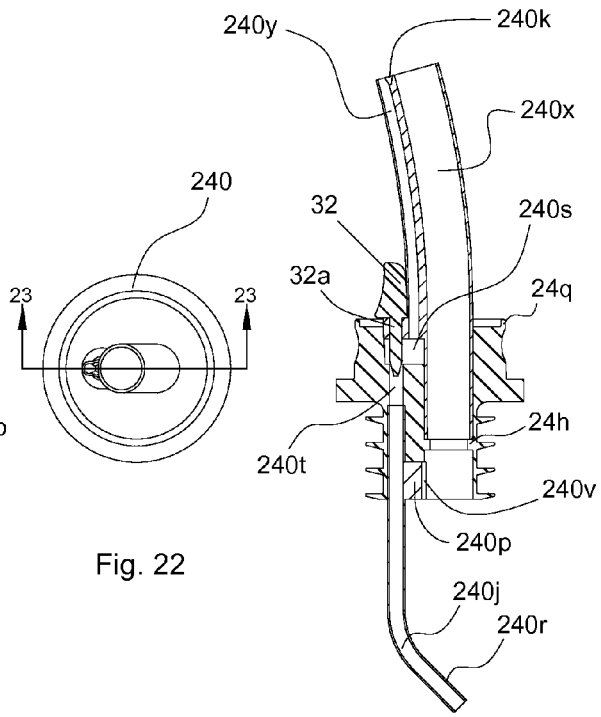
Fig. 21
Fig. 22
Fig. 23

VACUUM PUMP AND DISPENSER FOR BOTTLES

FIELD OF THE INVENTION

This disclosure is generally directed to a vacuum pump utilizing a specially designed spout for reducing oxygen exposure to fluids such as olive oil. The vacuum pump can either be used in combination with a specially designed spout or without the use of the specially designed spout.

BACKGROUND OF THE INVENTION

Oxygen in the air is very destructive to the quality of most food. Reducing exposure of oxygen from food is an effective method to preserve its quality before perishing. One of the popular practices of reducing oxygen exposure involves actively extracting air and mainly oxygen from inside an opened container. Simply capping or closing the container only keeps the air or oxygen already inside to degrade the food quality. Most commonly, bottles of partially consumed red wine are capped with vacuumable stoppers. The air inside can be vacuumed out by using either a manual or powered vacuum pump. There are numerous prior arts that detail various ways to accomplish vacuuming. This approach, however, has not been widely applied to bottles containing olive oil an in particular to olive oil bottles with a spout. In fact, there is a shortage of prior arts related to this subject. One of the reasons is that oil is viscous and tends to drip when being poured out of its bottle from a typical spout such as those that project straight up from a bottle's neck axially along the longitudinal axis of the bottle.

The typical pour spout prevents the use of typical vacuumable bottle stoppers in combination with a vacuum pump. Either the stopper or the spout is alternatively fitted into the bottle. When the pump is used, the stopper is used and when pouring fluid, the spout is used. Another reason is the size of the olive oil bottlenecks, which are not uniform and are typically larger than wine bottles. So stoppers for wine bottles do not fit or seal olive oil bottles very well.

Additionally, extracting of air from a food container typically requires the use of a vacuumable stopper, that has a one-way valve, and a vacuuming device either manually or mechanically. This setup involves three components: the container, a vacuumable stopper with a one-way valve, and a vacuum pump. When the container is a bottle, the user has to hold the bottle with the stopper inserted in its neck together with the pump with one hand while operating the pump's handle with the other hand. This practice is fairly easy when the bottle stopper is small and most of its body is inserted inside the bottleneck so all three components can be held by one hand leaving the other hand to pump. An example of this is the Joie Wine Pump Stopper, which is designed only for wine bottles without any pour spout. There's no reason or possible for the Joie Wine Pump Stopper to encapsulate the typical pour spout.

In the prior art by Bonich, U.S. Pat. No. 7,086,427, Bonich describes a vacuum pump, with a stopper, which has been especially designed as a closing means for closing the bottle while the vacuum pump remains with the bottle. Bonich's vacuum pump has to be pulled away from the bottle or yanked out with considerable force while creating an unpleasant popping sound. Another disadvantage of Bonich's invention is the difficulty of inserting its "closing means" into the bottle's neck since the one-way valve is hidden deep inside the pump. Soo's patent, U.S. Pat. No. 6,637,321, offers a cap and vacuum pump arrangement to be inserted inside a bottleneck with a means to release the vacuum. This design, however, has limited pump capacity and flexibility. Another vacuum pump arrangement by Schooley's, U.S. Pat. No. 7,743,796, details a bottle neck vacuum pump, which can be placed over a neck of a bottle and evacuate a significant portion of air from the bottle, which is power driven and expensive to manufacture. Another low-tech and unwieldy approach is offered by Michalopoupos, U.S. Pat. No. 7,395,942, which utilizes a bulb structure attached to a stopper to evacuate air from inside a bottle.

While the discussed references, do mention a pump and stopper arrangement, or a pump functioning as a cap, none of the references teach a vacuum pump encapsulating an elongated spout while the vacuum pump remains with the bottle as a cap.

SUMMARY OF THE INVENTION

The present invention describes a convenient approach for preserving liquids such as olive oil or wine by extracting air from a containing bottle equipped with a drip-proof dispenser.

The present invention provides for a drip-proof dispenser and a vacuum pump that engages the dispenser so that the dispenser creates a seal with the vacuum pump.

The present invention encapsulates a pour spout of the dispenser, while the user operates the pump with both hands while one exerts a force down putting pressure on the dispenser and the bottle thus avoiding a precarious arrangement while operating the pump. In other words, the present invention describes a novel design of a vacuum pump that is also a cap, so effectively there are only two components to hold with one hand while pumping with the other hand. This invention is also uniquely capable of being used on an olive oil bottle equipped with or without a pour spout.

Another aspect of this invention is a clever incorporation of a one-way valve for breaking the vacuum, i.e., de-vacuuming, so the pump can be easily removed from the bottle. The vacuum pump is used in conjunction with the dispenser or without the dispenser so as to put the pump over a wine bottle.

The vacuum pump incorporates an anti-pinching mechanism so that a user does not pinch the fingers while the pump is being used. The vacuum pump further incorporates a noise damper when using the vacuum pump. The vacuum pump further incorporates a biasing means for preventing accidental de-vacuuming of the pump. The biasing means will need to be overcome so that de-vacuuming occurs.

The present invention further incorporates a controllable dispenser where the user can modify the amount of flowing fluid from the dispenser. One can regulate pouring from drizzles for salads to fast pour for frying. The dispenser further incorporates catching running drip.

BRIEF DESCRIPTION OF THE DRAWINGS

FIG. 4 shows a side view of the one-way valve.

FIG. 5 shows a top view of the valve shown in FIG. 4.

FIG. 6 shows cross-sectional view 6-6 of FIG. 5.

FIG. 7 shows a top view of the valve fixed to the inner cylinder.

FIG. 8 shows cross-sectional view 8-8 of FIG. 7 showing the valve in the closed position.

FIG. 9 shows the valve in the opened positioned.

FIG. 10 shows a partial cross-section of the outer tube being pulled and showing the path of the airflow.

FIG. 11 shows a partial cross-section of the outer tube being pushed and showing the path of the airflow.

FIG. 19 shows a front view of the outer tube.

FIG. 20 shows cross-sectional view 20-20 of FIG. 19.

FIG. 21 shows a side view of a second embodiment of a dispenser.

FIG. 22 shows a top view of the dispenser shown in FIG. 21.

FIG. 23 shows cross-sectional view 22-22 of FIG. 22.

DETAIL DESCRIPTION OF THE DRAWINGS

Figure 1:
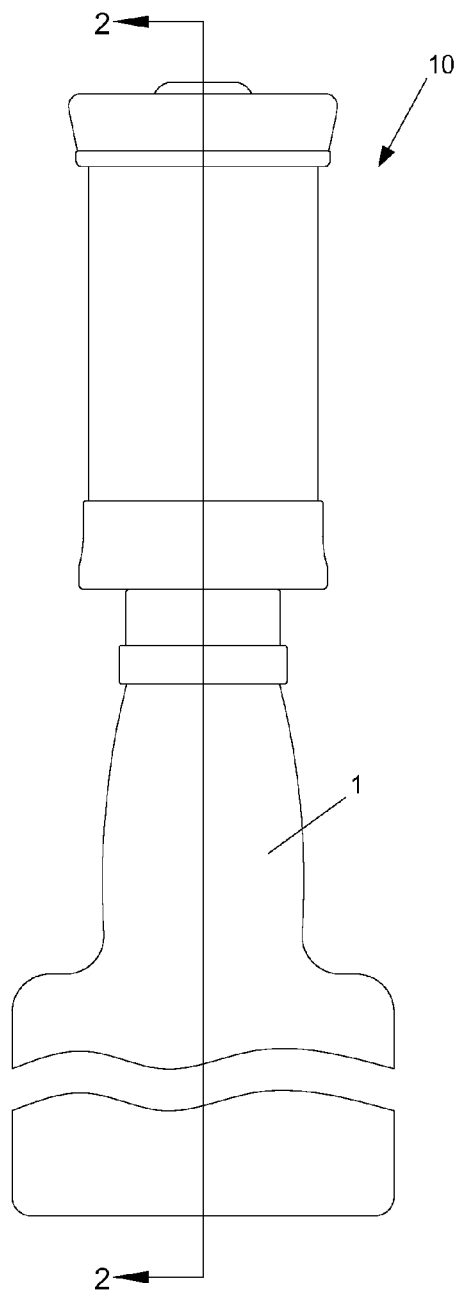
FIG. 1 shows front view of a vacuum pump fixed on top of a bottle.
Figure 2:
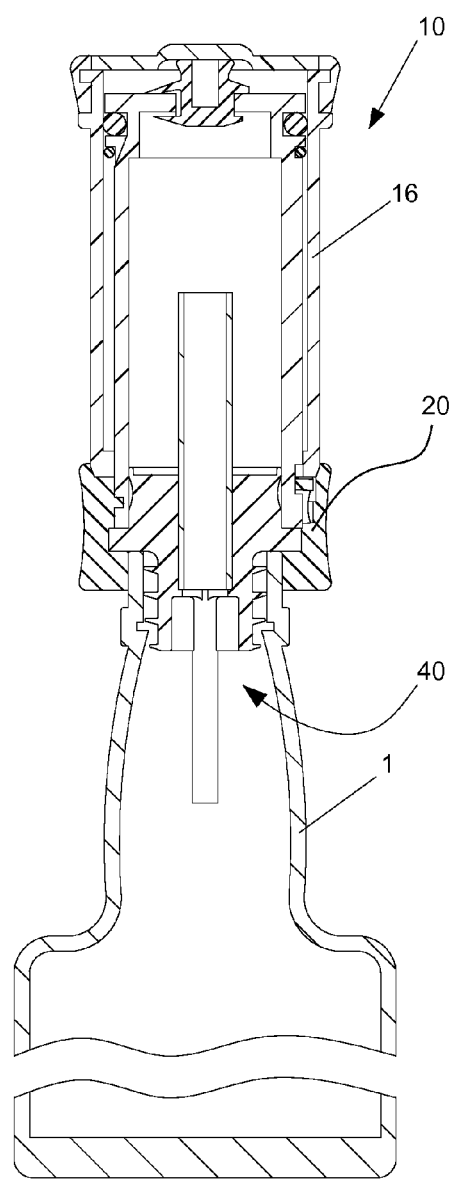
FIG. 2 shows a cross-sectional view 2-2 of the vacuum pump and bottle shown in FIG. 1.
Figure 3:
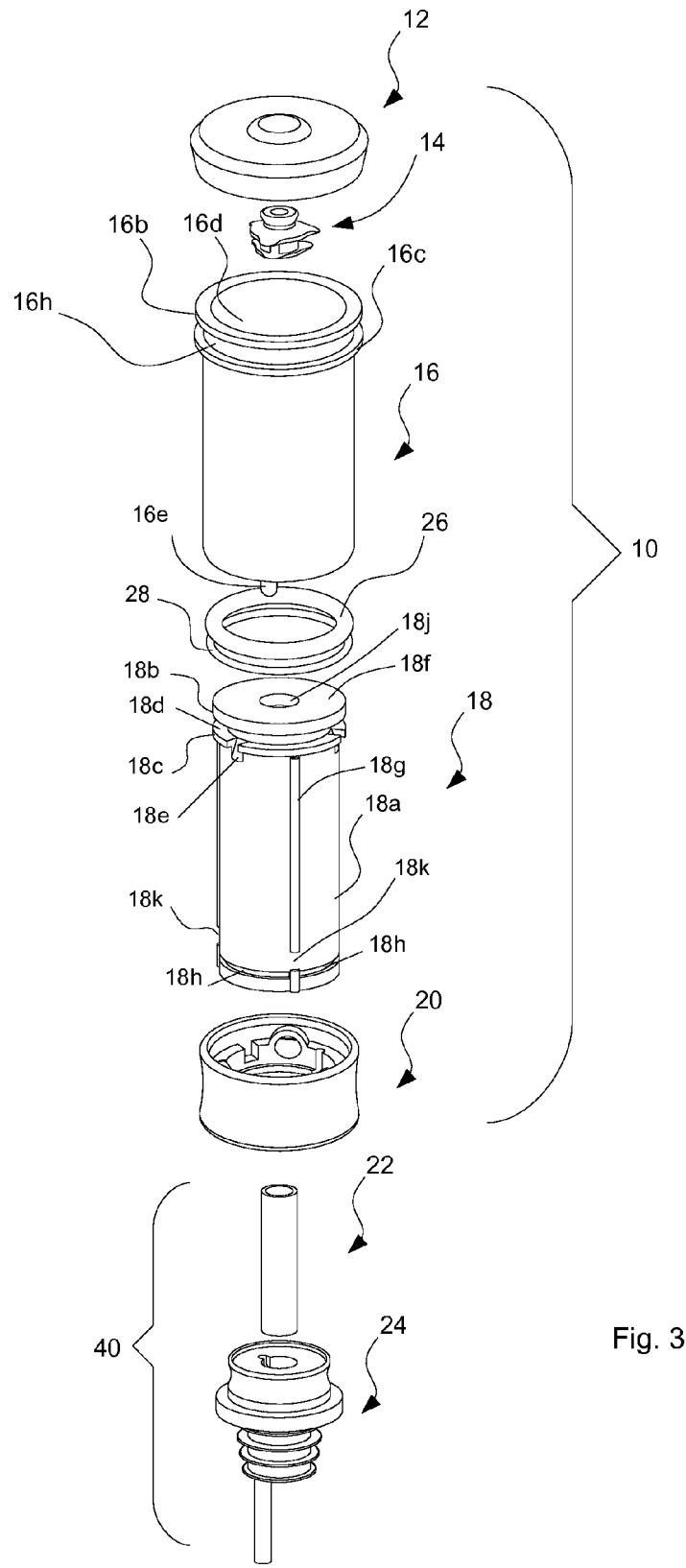
FIG. 3 shows an exploded view of the vacuum pump and the dispenser shown in FIGS. 1 and 2.
Figures 12, 13, 14, 15, 16, 17, 18:
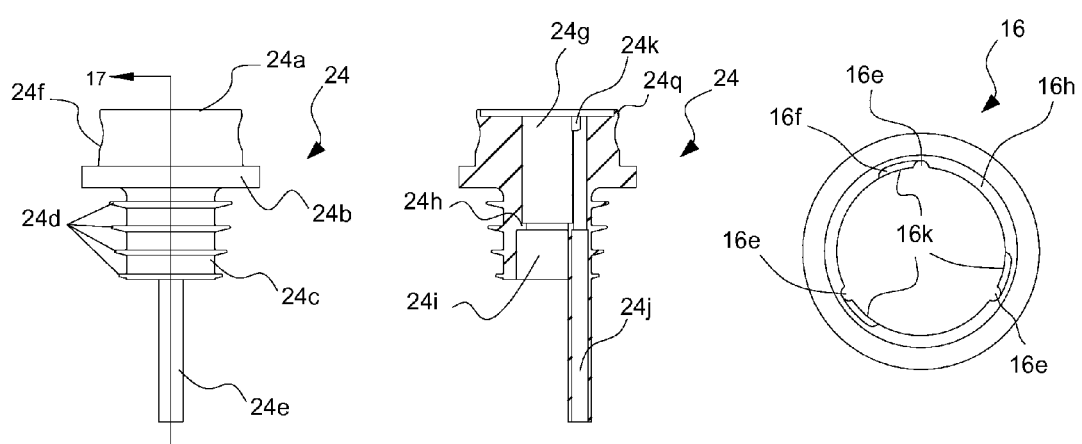
FIG. 12 shows a side view of the gripper.
FIG. 13 shows cross-sectional view 13-13 of FIG. 12.
FIG. 14 shows a bottom view of the rigid cap.
FIG. 15 shows cross-sectional view 15-15 of FIG. 14.
FIG. 16 shows a side view of the first embodiment of the dispenser.
FIG. 17 shows cross-sectional view 17-17 of FIG. 16.
FIG. 18 shows a top view of the outer tube.

FIG. 1 shows a vacuum pump 10 mounted to a bottle 1. The bottle 1 can be an olive oil bottle such as those that hold a dispenser 40 as shown in FIG. 2. Of course the bottle can hold any type of fluid and is not limited to the type of fluid. As shown in FIG. 3, the pump 10 includes an inner cylinder 18, an outer cylinder 16, a rigid end cap 12, a gripper 20, a seal 26, and a damper 28. The outer cylinder 16 telescopes relative to the inner cylinder 18. The outer cylinder 16 is slidably guided via three circumferentially spaced guide rails 18g on the inner cylinder 18. The guide rails 18g slide in corresponding axial notches 16e formed on an inner annular flange 16h of the outer cylinder 16 as shown in FIGS. 18 and 20. The outer cylinder 16 is capped with an end cap 12 that is comprised of a rigid plastic portion 12b and an overmolded rubber portion 12a that is vulcanized to the rigid plastic portion 12b. The overmolded portion 12a sits in an annular groove 16h that is delimited by a first flange 16b and a second flange 16c of the outer cylinder 16. The overmolded portion 12a contains an annular groove 12e that received the first flange 16b of the outer cylinder 16. The rigid portion 12b is comprised of annular disk that contains a dimple 12d and a cavity 12c.

The outer cylinder 16 is capped so as to house the inner cylinder 18 and yet allow the outer cylinder to slide and be able to be twist locked via arched projections 16k formed by sectored notches 16f on the inner flange 16h of the outer cylinder 16 as shown in FIG. 18. The sectored notches are 120 degrees spaced apart but of course this could have any spaced configuration. As shown in FIG. 3, the guide rails 18g are each split via a gap 18k that allows the sectored notches 16f to fit in. This configuration allows the outer cylinder 16 to be twist locked to the inner cylinder 18. As shown in FIGS. 3, 19, and 20, the outer cylinder 16 contains a set of three axial projections 16m that project from the inner flange 16h so as to allow the vacuum pump 10 to de-vacuum by being pressed downward and thus compresses the nipple of the vacuum valve.

As shown in FIGS. 3, 10, and 11, the inner cylinder 18 includes a main cylindrical body 18a, an end cover 18f, an annular groove 18d delimited by a first flange 18b and a second flange 18c at a first end, and three sectored grooves 18h at an opposite end. The annular groove 18d houses an O-ring seal 26 that functions to trap the air 15a when the outer cylinder 16 is pulled out as depicted by 14q as shown in FIG. 10. When the outer cylinder 16 is pushed down as depicted by 14p, air 15b will allow to flow from the outside to the inside via axial notches 18e formed on the second flange 18c thus allowing the outer cylinder to slide. The axial notches 18e although depicted as being tapered, the axial notches could as well be straight. A damper 28, comprised of a smaller O-ring, sits below the second flange 18c. The damper 28 dampens the noise usually made by vacuum pumps. The damper 28 is also residing above the guide rail 18g, which provides a stop to the damper 28 thus preventing the damper 28 to slide off. The end cover 18f contains a centered opening 18j to allow a one-way valve 14 to be affixed.

As shown in FIGS. 3, 12, and 13, the end of the inner cylinder 18 contains a rubberized gripper 20. The gripper 20 includes a main body 20a with an outside grip surface 20b that is concaved. The gripper 20 includes three inner flanges 20j that serves to engage the three sectored grooves 18h so as to keep the gripper 20 in place relative to the inner cylinder 18. The gripper 20 further contains three axial grooves 20g that allow the rails 18g to pass through and sit accordingly. The gripper 20 further contains three axial seats 20f that allow the axial projection 16m to fit when the outer cylinder is twist locked and further pushed in so as to flex three arched springs 20d formed by the same gripper material as a biasing means for preventing accidental de-vacuuming of the pump. The three arched springs 20d are separated by a gap 20h and further formed by circular relief holes 20e. The gripper 20 further contains an inner step 20k that is sized to fit a predetermined diameter of a bottleneck. The gripper 20 further features an anti-pinching flange 20c at the end of the main body 20a. The anti-pinching flange 20c is convenient so that the end user does not pinch their fingers while stroking the outer cylinder 16. The gripper 20 serves both as a holder to be grabbed by the user while stroking the outer cylinder 16 as well be a stand once removed from the bottle 1.

FIGS. 4-6 show the one-way valve 14 and its features. The valve 14 features a core 14a separating a first annular flange 14b and a second annular flange 14c. A nipple 14d projects from the first flange 14b. The first annular flange 14b has three spaced apart flaps 14h that thin out in thickness toward a distal end. At least three axial vents 14e extend along the core 14a each into a radial vent 14f that is under each of the flaps 14h. A counter-bore 14g extends from the end of the nipple 14d into the core 14a so as to make the one-way valve 14 collapse under a load 14x as seen in FIG. 9. FIG. 8 shows the valve 14 in a closed state and FIG. 9 shows the valve collapsed in an open state. The de-vacuum path 14y goes through the radial vent along the axial vent into the inner cylinder 18. The height of the core 14a is longer than the thickness of the end cover 18f of the inner cylinder 18 as shown in FIGS. 8 and 9.

FIGS. 16 and 17 shows the first embodiment of the insert 24 used in the first embodiment of the dispenser 40 shown in FIG. 3. The dispenser 40 includes a spout 22 and the insert 24. The insert 24 includes an annular body 24a, an annular flange 24b, and a tail 24c. The tail 24c contains a series of flexible fins 24d for engaging the inside of the bottle. The annular body 24 contains a concave relief gap 24f to ease the inner cylinder 18 so as to be in frictional contact. The annular body 24 terminates with a lip 24q. A vent tube 24e extends below the insert 24. A vent channel 24j extends from the vent tube 24e into the annular body 24. As seen in FIG. 2, the spout 22 is inserted into an insert hole 24g and stopped by an inner flange 24h. A flow conduit 24i is adjacent to the insert hole 24g. A shallow drain 24k is in flow communication with the vent channel 24j so as to collect dripped fluid coming out of the spout 22.

FIGS. 21-23 shows a second embodiment of the dispenser 400. In this version, some common features are present as those found in the first embodiment. Notably differences is that the spout 220 contains two separate conduits 240x, 240y. The first conduit is the dispensing conduit 240x while the second conduit 240y serves both as a vent and a drip return. A drain 240k serves to catch any drips from the first conduit 240x. The second conduit or vent channel 240y blends into a reservoir 240s, a vertical opening 240t, and into the vent channel 240j in the vent 240e. A slidable valve 32 with a needle 32a regulates the flow of entering air and consequentially controls the flow of dispensing through the first conduit 240x from the reservoir 240s into the vertical opening 240t. The control can go from drizzles to fast pouring. The vent 240e features a bent portion 240r at the end of the vent 240e to facilitate the flow of entering air into the bottle by essentially preventing formation of airlock, which would hinder the liquid outflow. Furthermore, when the vent 240e is not an integral part of the insert 240, the vent 240e features a seating projection 240p that sits on seat 240v under the tail 240c.

Figure 24:
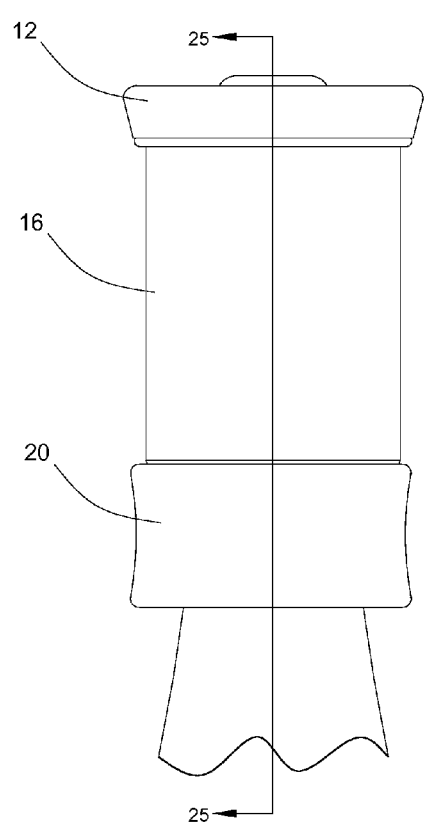
FIG. 24 shows a front view of a second embodiment of the vacuum pump.
Figure 25:
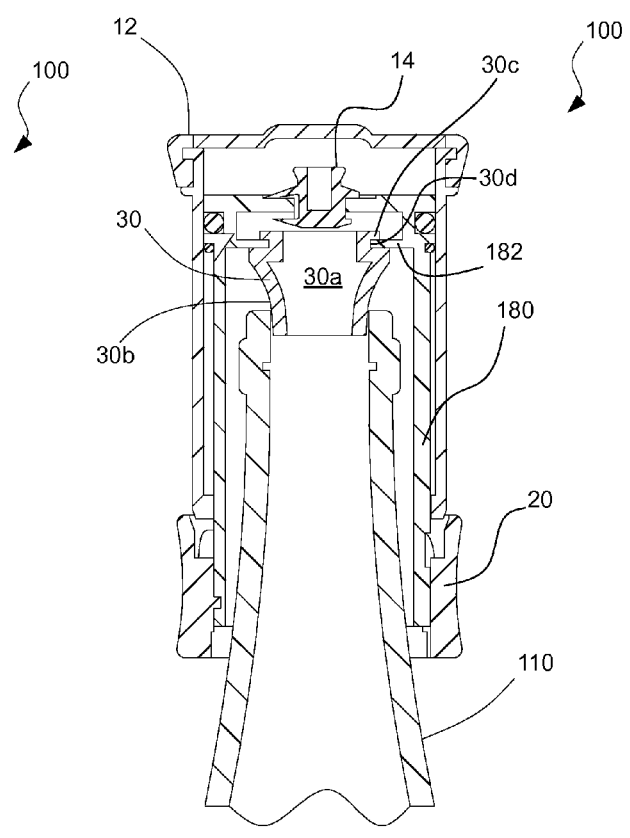
FIG. 25 shows cross-sectional view 25-25 of the vacuum pump shown in FIG. 24.

FIGS. 24 and 25 show a second embodiment of the vacuum pump 100 utilizing a bottle seal 30 inside a modified inner cylinder 180. It should be noted that the same corresponding components of the first embodiment of the vacuum pump 10 are present in the second embodiment. In particular, the same features found in the inner cylinder 18 are present in the second embodiment of the inner cylinder 180. In addition to the same features, a mounting wall 182 is spaced from the end cover 18f of the inner cylinder 18 so that the seal 30 is mounted in a center hole 182a. The seal 30 is provided with an annular groove 30b at one end and engaging the edge of the center hole 182a. A flow conduit 30a is present through the entire seal 30 along a longitudinal axis so that air can flow from the bottle. The seal 30 further features a tapered outer surface to stabilize the vacuum pump against the bottle 110. The use of this seal 30 allows the vacuum pump to be affixed to the bottle 110. When one needs to de-vacuum the bottle 110, one simple rotates and presses the outer cylinder 16 until the projections 16m of the outer cylinder are received in the axial seats 20f of the gripper 20.

It should be noted that the insert 24, 240 can made of silicone rubber or thermoplastic elastomer (TPE) of a desirable durometer, which is inserted into the bottleneck and covers its rim to form a tight seal. Furthermore, the valve 14 is uniquely different from all other existing valves in that the radial vents 14f are diverted to the side, instead of downward. This feature is valuable to avoid splashing of liquid or dusting of powdery substances of a bottle or container caused by strong entering air streams during de-vacuuming. It should be envisioned that the spout 22 can be either straight or slightly curved as shown in FIG. 21. The valve 14, the bottle seal 30, and the insert 24, 240 are to be made from flexible material. The inner and outer cylinders 16, 18 although depicted being made of plastic can be made of any other rigid material. It is also envisioned that the arched springs 20d, although being integral with the gripper 20 can be made separately. The arched springs 20d although being disclosed as the biasing means in this invention, other types of compression springs can be envisioned.

The invention claimed is:

1. A vacuum pump comprising an inner tube, an outer tube, a one-way valve, and an end cap;
    wherein the outer tube being telescopingly slidable relative to the inner tube;
    wherein the inner tube comprising two annular flanges delimiting an annular groove housing a circular seal;
    wherein one of the two flanges comprises at least one axial notch;
    wherein the inner tube being closed at one end with the one-way valve and being open at an opposite end to receive a dispenser or a bottle; and
    wherein the outer tube being closed with the end cap;
    wherein the outer tube comprising at least one axial notch receiving at least one guide rail on an outer surface of the inner cylinder;
    wherein the guide rail contains a gap to receive at least one arched projection formed on an inner flange of the outer cylinder;
    wherein the inner flange is provided with a sectored notch and wherein the arched projection is adjacent to the axial notch and receivable in the gap to position the outer cylinder in a twist locked position.

2. The vacuum pump of claim 1, further comprising a gripper mounted to the end of the inner cylinder and including at least one seat on an inner flange of the gripper;
    wherein the outer cylinder further comprises at least one axial projection receivable in the seat after the outer cylinder being in the twist locked position to deform the one-way valve.

3. The vacuum pump of claim 2, wherein the gripper further comprises at least one biasing means for preventing accidental de-vacuuming.

4. The vacuum pump of claim 3, wherein the biasing means comprises at least one arcuate spring integral with the inner flange of the gripper.

5. The vacuum pump of claim 1, wherein the one-way valve comprising a core, at least one flexible flap, and a nipple; the core including an axial vent, and the flap including a radial vent being in continuous flow with the axial vent.

6. The vacuum pump of claim 5, wherein the nipple includes a counterbore for ease of collapsing the valve.

7. The vacuum pump of claim 5, wherein the flexible flap is thinned-out toward an end.

8. The vacuum pump of claim 1, wherein the inner tube further includes a damper below the second flange of the inner tube.

9. The vacuum pump of claim 2, wherein the gripper further comprises an anti-pinching flange at the end of the gripper.

10. The vacuum pump of claim 1, in combination with the dispenser, wherein the dispenser comprises an insert including annular body and a tail; wherein the annular body being inserted inside the inner tube.

11. The vacuum pump of claim 10, wherein the dispenser further comprises a spout.

12. The vacuum pump of claim 10, wherein the tail includes at least one flexible fin.

13. The vacuum pump of claim 10, wherein an annular flange separates the annular body and the tail.

14. The vacuum pump of claim 10, wherein the insert further includes a vent including a vent conduit extending along the insert and past the insert.

15. The vacuum pump of claim 14, wherein the vent includes a bent portion at the end of the vent to facilitate flow of entering air into a bottle by preventing formation of airlock.

16. The vacuum pump of claim 15, wherein the annular body further includes a drain being in flow communication with the vent channel.

17. The vacuum pump of claim 15, wherein the annular body further comprises a concave relief gap.

18. The vacuum pump of claim 15, wherein the vent channel is separate from a dispensing conduit of the spout.

19. The vacuum pump of claim 18, wherein a drain is at a distal end of the spout in flow communication with the vent channel.

20. The vacuum pump of claim 18, wherein the insert further includes a slidable valve with a valve needle to control fluid dispensing from drizzles to fast pouring in a reservoir in flow communication with the vent channel.

21. The vacuum pump of claim 2, the inner cylinder further includes a seal mounted inside the inner cylinder.

22. The vacuum pump of claim 21, wherein the seal being mounted inside the inner cylinder comprises an outside tapered surface and a flow conduit along a longitudinal axis.

23. A vacuum pump comprising an inner tube, an outer tube, a one-way valve, an end cap and a gripper;
   wherein the outer tube being telescopingly slidable relative to the inner tube;
   wherein the inner tube comprising two annular flanges delimiting an annular groove housing a circular seal;
   wherein one of the two flanges comprises at least one axial notch;
   wherein the inner tube being closed at one end with the one-way valve and being open at an opposite end to receive a dispenser or a bottle; and
   wherein the outer tube being closed with the end cap;
   wherein a gripper is mounted to the end of the inner cylinder and including at least one seat on an inner flange of the gripper;
   wherein the outer cylinder further comprises at least one axial projection receivable in the seat after the outer cylinder being twisted in a locked position to deform the one-way valve.

24. The vacuum pump of claim 23, wherein the gripper further comprises at least one biasing means for preventing accidental de-vacuuming.

25. The vacuum pump of claim 24, wherein the biasing means comprises at least one arcuate spring integral with the inner flange of the gripper.

* * * * *